United States Patent [19]

Bloch et al.

[11] 3,910,994

[45] *Oct. 7, 1975

[54] ALKYLAROMATIC SULFONATE DETERGENT PROCESS

[75] Inventors: Herman S. Bloch, Skokie; George E. Illingworth, Arlington Heights; George W. Lester, Park Ridge, all of Ill.

[73] Assignee: Universal Oil Products Company, Des Plaines, Ill.

[ * ] Notice: The portion of the term of this patent subsequent to Aug. 1, 1989, has been disclaimed.

[22] Filed: June 3, 1974

[21] Appl. No.: 476,007

Related U.S. Application Data

[60] Continuation of Ser. No. 275,380, July 26, 1972, abandoned, which is a division of Ser. No. 787,268, Dec. 26, 1968, Pat. No. 3,681,442.

[52] U.S. Cl. ......... 260/505 A; 252/558; 260/501.21; 260/505 N; 260/505 S; 260/512 R; 260/621 R; 260/645; 260/671 B
[51] Int. Cl.² ..................................... C07C 143/24
[58] Field of Search ................... 260/505 A, 505 S

[56] References Cited
UNITED STATES PATENTS

| | | | |
|---|---|---|---|
| 3,333,014 | 7/1967 | Adams et al. | 260/505 |
| 3,681,442 | 8/1972 | Bloch et al. | 260/505 |

*Primary Examiner*—Joseph E. Evans
*Assistant Examiner*—A. Siegel
*Attorney, Agent, or Firm*—James R. Hoatson, Jr.; Thomas K. McBride; William H. Page, II

[57] ABSTRACT

Alkylaromatic sulfonates, containing a $C_9$—$C_{18}$ linear alkyl group, are prepared by sulfonating the corresponding alkylbenzene in admixture with a $C_9$—$C_{18}$ n-paraffin and neutralizing the resultant alkylbenzene sulfonic acid, in admixture with the same paraffin, to produce a relatively colorless neutralized alkylbenzene sulfonate. This process is particularly adaptable where a $C_9$—$C_{18}$ n-paraffin stream is first converted to an alkylatable compound such as a monohalogen and such compound is not readily separable from the n-paraffin. Thus, the alkylation, sulfonation and neutralization are all performed in admixture with the unreacted n-paraffin whereby the paraffin is readily separable from the final product, for recycle purposes.

2 Claims, No Drawings

ALKYLAROMATIC SULFONATE DETERGENT PROCESS

CROSS-REFERENCE TO RELATED APPLICATIONS

This application is a Continuation of our copending application Ser. No. 275,380, filed July 26, 1972 now abandoned, which is, in turn, a Division of our copending application Ser. No. 787,268, filed Dec. 26, 1968, now U.S. Pat. No. 3,681,442, the teachings of both of which are incorporated herein by specific reference thereto.

BACKGROUND OF THE INVENTION

This invention relates to a process for the production of alkylaromatic sulfonates containing a $C_9$—$C_{18}$ linear alkyl group. Generally, it is concerned with separating a $C_9$—$C_{18}$ n-paraffin from a hydrocarbon mixture containing the paraffin, converting said paraffin to an olefin-acting compound, in particular, a monochlorinated or monobrominated paraffin, alkylating with said compound, in admixture with the unconverted paraffin, a monocyclic alkylatable aromatic hydrocarbon to form an alkylaromatic hydrocarbon containing a linear $C_9$—$C_{18}$ alkyl group, sulfonating said alkylaromatic hydrocarbon and neutralizing the resultant sulfonic acid, both reactions in admixture with the unconverted paraffin, separating from the neutralized product, alkylaromatic sulfonates and unconverted n-paraffin, and recycling said paraffin to be converted into the aforementioned olefin-acting compounds. Specifically, this invention relates to separating the hydrocarbon phase containing the unconverted paraffin and alkylaromatic sulfonate from the acid phase, formed in the sulfonation reaction and neutralizing the hydrocarbon phase, recovering therefrom n-paraffins and neutralized sulfonic acid of excellent color quality. Further, this invention is concerned with sulfonating an alkylaromatic hydrocarbon containing a $C_9$—$C_{18}$ n-paraffin and neutralizing the resultant sulfonate in admixture with the same paraffin to provide a detergent of excellent color quality.

Processes for the production of biodegradable detergents have gained considerable importance within the last few years because of the water pollution problem, stemming in part from sewage disposal and longevity of detergents dissolved in this sewage. The presence of detergents dissolved in the sewage is the deleterious consequence of the inability of bacteria to degrade the original detergents. When these non-biodegradable detergents are aerated, such as when the treated sewage is discharged into rivers and lakes, large quantities of foam result. The diluted detergent solutions often enter subsurface waters which ultimately feed into the underground water strata serving many cities as a source of water supply. Occasionally, these detergents turn up in sufficient quantities in tap water to cause the water to foam at the tap.

The petrochemical industry has attempted to solve the foam problem in sewage disposal plants, etc. through the development of biodegradable detergents. It has been found that alkylaryl-based detergents are more readily degradable by sewage bacteria if the alkyl substituent on the phenyl nucleus is of a simple, straight-chain configuration than if it is of a more complex branched chain structure. As an example, detergent compounds in which the alkyl side chain has a structure such as: $CH_3$—$CH(CH_2)_9$—$CH_3$ are more likely to be bacterially digested than detergents of the same chemical composition but in which the isomeric alkyl radical is a more highly branched chain, such as:

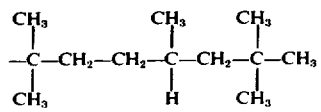

These biodegradable detergents are generally manufactured by the isolation of $C_9$—$C_{18}$ n-paraffins from mixtures containing the paraffins utilizing molecular sieves or urea adduction, and converting the n-paraffin to an olefin-acting compound such as a monohalogenated paraffin or a mono-olefin, or by the cracking of saturated paraffin waxes to produce a linear olefin. These olefin-acting compounds are then used to alkylate a mono-cyclic aromatic such as benzene and the resultant alkylaromatic is sulfonated and neutralized to form the desired detergent.

Complete conversion of the n-paraffin to olefin-acting compounds is not possible because of undesired side reaction which occur in both halogenation and dehydrogenation reactions at high conversions, lessening the overall selectivity and yield. In addition, one of the common sources of $C_9$—$C_{18}$ paraffins, utilized in forming olefin-acting compounds, are those $C_9$—$C_{18}$ paraffins present in the kerosene fraction of petroleum. The n-paraffins separated from this fraction are often converted to the corresponding olefin-acting compounds without separating the $C_9$—$C_{18}$ n-paraffin homologs from each other. As a result of the incomplete conversion to olefin-acting compounds, there results a mixture of the unconverted paraffins and the resultant olefin-acting compounds. In prior art processes, this mixture is separated into an olefin-acting compound stream and a recycle paraffin stream. However, since the reaction product contains a complex mixture of the various olefin-acting compound isomers along with the unconverted paraffin, this separation is accomplished only by exotic and intricate separation techniques. This is particularly true in the conversion of a mixture of the $C_9$—$C_{18}$ paraffin homologs to the corresponding olefin-acting compounds. Here, there is an overlap in boiling points between the unconverted paraffins and the olefin-acting compounds formed from this mixture. Present prior art processes approach this problem through utilization of intricate separation techniques as previously mentioned, or by utilizing a narrower carbon number range in the paraffins converted. A further problem present in prior art processes arises in maintaining a neutralized alkylaromatic sulfonate free from discoloration and from excessive amounts of inorganic salts such as sodium sulfate. Current processes maintain their production of such sulfonates relatively free from discoloration and excessive amounts of inorganic salts through complex manipulation of the operating variables such as reaction temperature, sulfonating agent purity and strength, sulfonating agent to alkylaromatic ratio, reaction time, feed purity, and conversion. In addition, bleaching techniques are often employed to bring the final product up to color specifications.

SUMMARY OF THE INVENTION

Accordingly, it is an object of this invention to provide a new, improved process for the manufacture of alkylaromatic sulfonate detergents. Specifically, it is an object of this invention to provide a novel means of producing alkylaromatic sulfonates containing a linear $C_9$—$C_{18}$ alkyl group derived from the corresponding n-paraffins without the necessity of intricate means for the separation of the unreacted paraffin. More specifically, it is an object of this invention to provide a means for producing relatively color-free neutralized alkylaromatic sulfonates.

In an embodiment, this invention relates to a process for producing an alkylaromatic sulfonate containing a $C_9$—$C_{18}$ linear alkyl group, which comprises the steps of: (a) separating a $C_9$—$C_{18}$ n-paraffin from a hydrocarbon mixture containing said n-paraffin; (b) monohalogenating said n-paraffin, recovering from the resultant halogenated effluent, monohalogenated paraffin in admixture with unreacted n-paraffin; (c) alkylating with said monohalogenated paraffin, in admixture with the unreacted paraffin, a monocyclic aromatic to form an alkylaromatic containing a $C_9$—$C_{18}$ linear alkyl group; (d) separating, from the resultant alkylated effluent, unreacted monocyclic aromatics; (e) sulfonating said alkylaromatic in admixture with said n-paraffin to form an alkylaromatic sulfonic acid; (f) separating the resultant sulfonation mixture into an acid phase and a hydrocarbon phase containing said n-paraffin and said sulfonic acid; (g) neutralizing the alkylaromatic sulfonic acid contained in said hydrocarbon phase to form a neutralized alkylaromatic sulfonate in admixture with said n-paraffin; (h) separating, from the mixture of step (g), said n-paraffin and said neutralized aromatic sulfonate; and, (i) recycling at least a portion of said n-paraffin to said monohalogenation step.

In summary, a principal advantage of this invention resides in the ability to produce relatively color-free alkylaromatic sulfonates containing a linear $C_9$—$C_{18}$ alkyl group by sulfonating an alkylaromatic, containing said alkyl group, in admixture with $C_9$—$C_{18}$ n-paraffin and neutralizing the hydrocarbon phase of the sulfonation reaction. Further advantages of the invention reside in the ability to convert $C_9$—$C_{18}$ n-paraffins to olefin-acting compounds, alkylating with such compounds to form alkylaromatics, sulfonating the alkylaromatics and neutralizing them, all with the reactants in admixture with unconverted n-paraffins, thus eliminating intermediate separation of the paraffin, with the ability to operate over a wider carbon number range than has been heretofore available from prior art processes.

DESCRIPTION OF PREFERRED EMBODIMENTS

The $C_9$—$C_{18}$ n-paraffins utilized in this invention may be obtained from any suitable source including an appropriate fraction of a straight run petroleum distillate, typically those in the kerosene range; the products of the Fischer-Tropsch reaction, a process by which paraffinic hydrocarbons in the $C_9$—$C_{18}$ range are formed by the reaction of hydrogen with carbon monoxide; the hydrogenated products of ethylene polymerization; and the hydrogenated fatty acids which upon complete reduction, produce paraffinic hydrocarbons having a straight chain configuration. Although any source containing $C_9$—$C_{18}$ n-paraffins may be utilized in this invention, the preferred source is a kerosene boiling range fraction boiling in the range from about 170°C. to about 300°C.

All of the foregoing enumerated n-paraffin sources have a significant amount of branched chain isomers in admixture with the n-paraffins which must be separated if said paraffin is to be utilized in the preparation of alkylaromatic sulfonates containing a linear alkyl group. These n-paraffins may be separated by any of the procedures known to the art, the exact method of separation not being critical to this invention. Such separation processes include those employing molecular sieve sorbents or urea adduction. The separation processes involving molecular sieves are characterized in that the zeolite structure is a crystalline alumino-silicate containing pores of about 5 Angstroms in cross-sectional diameter which are of sufficient size to permit the entry of n-aliphatic compounds, but are not of sufficient size to permit the entry of branched chain or cyclic compounds. As a result, when a mixture containing n-aliphatics contacts these sieves, the linear aliphatic compounds are selectively sorbed and recovered. These separation processes are well known to the art, as exemplified by U.S. Pat. Nos. 2,985,589; 3,274,099 and 3,310,486.

While the use of molecular sieves constitutes the preferred separation means, another separating agent applicable is urea, a compound which forms an adduct or clathrate with straight chain compounds. This separation is typically accomplished by mixing urea with a hydrocarbon fraction containing n-paraffins, thereby forming a crystalline adduct with the normal components, recovering the crystals, and freeing the normal hydrocarbons by heating the crystals or by displacement with a preferentially sorbed compound such as an alcohol, aldehyde, or other aliphatic compound containing a polar radical.

The recovered $C_9$—$C_{18}$ n-paraffin may be converted by known methods to one of the known olefin-acting compounds applicable within this invention. These compounds include olefins, alcohols, ethers, esters, the latter including alkyl halides, alkyl sulfates, alkyl phosphates, and esters of carboxylic acids, with the monoolefins and monohalogenated paraffins being preferred. The olefin-acting compound must be capable of providing a $C_9$—$C_{18}$ straight chain alkyl group on a single aromatic nucleus, to be utilized in this invention, thus eliminating those compounds having more than one reactive group such as polyolefins and polyhalogenated paraffins.

Of the monohalogenated paraffins, the monochlorinated and monobrominated are preferred. The technique of preparing such compounds by the halogenation of the corresponding paraffin is well known in the art, and reference thereto may be had for specific details of the process. These halogenation techniques generally involve reacting the paraffin under carefully controlled conditions to insure monohalogenation and minimize the formation of polyhalides. The reactions are generally carried out by contacting bromine or chlorine and excess normal paraffin. Catalytic agents, such as diffused sunlight, light of a specific wavelength, i.e. artificial ultraviolet light, or trace amounts of iodine are often employed. The resultant monohalogenated paraffins consist of a mixture of the various linear isomers with the internal halogenated isomers being more prevalent.

The other preferred olefin-acting compounds, the linear mono-olefins, may be derived by methods known to the art such as cracking of long chain saturated paraffins, dehydrohalogenation of the aforementioned monohalogenated paraffins or by the selective dehydrogenation of the corresponding linear paraffins. The selective dehydrogenation of the n-paraffins yields a mixture of the corresponding internal olefin isomers and is typically effected by processes which include contacting the n-paraffin with a dehydrogenation catalyst containing a support having an alkali metal compound thereon and promoted with a metal or metal compound selected from the metals of the Groups VI and VIII of the Periodic Table. Other catalysts suitable for the dehydrogenation of straight chain paraffins to form straight chain mono-olefins comprise refractory spacing agents or carriers selected from the group consisting of activated alumina, magnesia, silica and diatomaceous earth, and minor amounts of the metal and/or metallic oxides of elements selected from members of Groups IVB, VB, and VIB, Group VIII, and Group IB of the Periodic Table (E. H. Sargent & Co., 1964) and include titanium, zirconium, hafnium, and vanadium, niobium, and tantalum; chromium, molybdenum, and tungsten; iron, cobalt, nickel, platinum, palladium, copper, silver, and the like, including mixtures of the foregoing. Usually nonacidic catalysts are desirable since they minimize the amount of isomerization of the n-paraffins or resulting mono-olefins to their branched chain isomers.

Especially preferred are those processes which contact the n-paraffin with a catalytic composite of alkalized alumina, a Group VIII metallic component, and a metallic component of arsenic, antimony, bismuth, and compounds thereof, at dehydrogenating conditions including a temperature of about 400°C. to about 600°C., operating pressures of about 10.0 psig. to about 100 psig., a mole ratio of hydrogen to liquid hydrocarbon charge of less than 15:1 and a liquid hourly space velocity above 12.0. Particularly preferred are those catalysts which are catalytic composites of alumina containing from about 0.01% to about 1.5% by weight lithium, from about 0.05% to about 5.0% by weight of a Group VIII noble metal component and a metallic component selected from the group consisting of arsenic, antimony, bismuth, and compounds thereof in an atomic ratio to said Group VIII component of from about 0.20 to about 0.50.

Typically, these dehydrogenation processes have conversions from about 5% to about 25% and selectivities greater than 90%. Higher conversions are possible but not practical because of undesired side reactions which lower selectivity. The resultant dehydrogenation effluent may be separated to recover the linear mono-olefins from the unreacted n-paraffins, but since the subsequent alkylation, sulfonation, and neutralization are to take place in the presence of a $C_9$—$C_{18}$ paraffin, it is more practical and feasible to perform these steps in the presence of the undehydrogenated n-paraffin, thus eliminating intermediate separation. This same principle applies to those processes wherein the paraffin is first monohalogenated. Thus, the unreacted n-paraffin remaining after the formation of the olefin-acting compound is readily recoverable after the sulfonation and neutralization and may be recycled and converted to additional olefin-acting compound.

The aromatic reactants which are alkylated with the olefin-acting compounds to yield a mono-alkylate include the mono-cyclic aromatics selected from the group consisting of benzene, toluene, xylene, ethylbenzene, diethylbenzene, phenol, and mono-nitrobenzene. The alkylation reaction is effected in the presence of a suitable catalyst capable of promoting the condensation reaction between the olefin-acting compound and the monocyclic aromatic. Such catalysts are generally an inorganic material characterized as an acid-acting compound which catalyzes the alkyl transfer reaction involved. Such inorganic compounds include certain mineral acids such as sulfuric acid containing preferably less than 10% water; hydrofluoric acid of at least 83% concentration and containing less than 10% water; liquefied anhydrous hydrogen fluoride; anhydrous aluminum chloride or aluminum bromide; boron trifluoride, preferably utilized in admixture with concentrated hydrofluoric acid; and other acid-acting catalysts, particularly of the Friedel-Crafts class of metal halides when the olefin-acting compound is the monohalogenated paraffin. Such alkylation reaction conditions and procedures are well known to the art and reference may be made thereto for specific details. Preferred alkylation conditions include temperatures of about −20°C. to about 40°C., a molar excess of aromatic to olefin-acting compound and a molar ratio of catalyst to olefin-acting compound of 0.01 or greater.

The alkylation reaction effluent is separated to recover the organic portion from the used catalyst. When utilizing a molar excess of aromatic, the olefin is essentially completely consumed and the reactant product is essentially the desired mono-alkylate. The unreacted aromatic is separated from the aromatic-alkylaromatic-n-paraffin mixture, and recycled to the alkylation reaction, by methods known to the art, including distillation and solvent extraction via sulfolane, glycol, etc. Separation of the unreacted aromatic is effected to avoid subsequent sulfonation thereof.

Sulfonation conditions include those well known to the art. The amount of n-paraffin present, the essence of this invention, is that amount required to remove the alkylaromatic sulfonate from the acid, leaving the color-bodies in the acid phase. This amount typically is in the range of about 20% to about 96 weight % of the n-paraffin-olefin-acting compound mixture passed to the alkylation zone. This concentration includes that concentration of unconverted n-paraffins present in the monohalogenation or dehydrogenation reaction effluent. It is to be emphasized that the $C_9$—$C_{18}$ n-paraffin present in the sulfonation and neutralization steps need not be "carried over" from the previous steps and may be commingled with pure alkyl-aromatic being passed to the sulfonation reaction.

Sulfonation conditions include a temperature of about −20°C. to about 60°C. and such reactions may be conducted continuously or batchwise. The hydrocarbon feed may be given an acid wash with sulfuric acid below sulfonating strength to remove impurities present in the feed. Sulfonating agents which may be utilized are essentially anhydrous sulfuric acid, relatively weak oleum, or even free sulfur trioxide. Such agents are preferably used in excess of that required for complete sulfonation. Specifics regarding sulfonation of alkylaromatics are well known to the art and may be obtained by reference thereto. An acid phase containing color bodies and a hydrocarbon phase containing the relatively color-free alkylaromatic sulfonic acid, are separated from the resulting sulfonation product.

The color bodies formed in the sulfonation reaction are the products not only of reactions involving impurities present in the hydrocarbon feed and/or sulfonating agent but also of undesirable side reactions between the principal reactants. These side reactions can be minimized but not eliminated by manipulation of operating variables. Inevitably, some color bodies are formed which ultimately must be removed. Since the process of this invention selectively removes the alkylaromatic sulfonate from the color bodies formed during sulfonation, minor upsets in operating variables will not have as adverse an effect upon product quality as heretobefore experienced. In other words, this process is not as sensitive to operating variables which result in the inclusion of color bodies in the final product, as the prior art processes.

The alkylaromatic sulfonic acids present in the hydrocarbon phase removed from the sulfonation reaction are neutralized to form a water-soluble alkylaromatic sulfonate detergent, preferably, with an alkaline compound of potassium, sodium, lithium or magnesium with sodium being especially preferred. These bases are preferably utilized in aqueous solutions and include aqueous solutions of the corresponding hydroxides and carbonates. Other basic compounds which may be utilized in this invention include ammonia and the basic ammonium compounds and the lower molecular weight amines. Of the neutralization conditions, temperature is the most important and should be maintained at below 70°C. to avoid decomposition reactions. Other neutralization conditions and techniques are well known to the art and reference may be had thereto for further particulars.

The neutralized sulfonic salts may be recovered by any of those methods known to those trained in the art including steam distillation of the neutralized mixture, spray drying, drum drying, etc. Typically, the alkylaryl sulfonate is neutralized with aqueous sodium hydroxide, thus extracting the water soluble neutralized sulfonic salt from the n-paraffin phase to the aqueous phase. The resultant aqueous solution is dried by methods known to the art thereby recovering dry, inorganic salt-free, colorless detergent. The unreacted n-paraffin is readily separated from the final neutralization product since it forms a salt-free upper phase distinct from the aqueous lower phase. Thus, the n-paraffin recovered from this step may be recycled to be admixed with the alkylaromatic being passed to the sulfonation step, or, more typically, back to the step wherein the n-paraffins are first converted to olefin-acting compounds such as the monohalogenated paraffins or mono-olefins.

The presence of a $C_9$—$C_{18}$ n-paraffin in the alkylation, sulfonation and neutralization steps serves a multifold purpose. Not only does it create a process not requiring intermediate separation of the olefin-acting compound and its paraffin derivative, but it also provides a process more readily operable in the sulfonation step that produces a relatively color-free product. The physical presence of the paraffin in these steps serves, first, as a heat sink for the exothermic alkylation, sulfonation, and neutralization reactions, and, secondly, as a diluent to insure uniformity within the reaction, thus rendering it more amenable to agitation. Thirdly, the alkylaromatic sulfonic acids formed in the sulfonation reaction are removed from the acid phase into the n-paraffin phase, leaving the majority of the color bodies in the acid phase. The import of this feature is obvious. First of all, the presence of the alkylaromatic sulfonic acids formed in the sulfonation reaction within the n-paraffin phase reduces the amount of base necessary to neutralize the sulfonic acids heretobefore available in processes wherein the spent sulfonating agent and sulfonate are neutralized together; secondly, it renders a sulfonate upon neutralization free from the inorganic salt of the sulfonating agent. Most importantly, the great majority of the color-bodies formed within the sulfonation reaction remain in the acid phase, yielding a relatively color-free paraffin phase which upon neutralization, yields a detergent with much improved color characteristics than have heretobefore been available to the art other than through the use of extraneous exotic purification methods.

The process of the present invention is further described in the following illustrative example which is, however, not presented for the purpose of limiting the scope of the invention, but in order to further illustrate the embodiments of the present process.

EXAMPLE

A straight-run petroleum fraction (recovered from a Michigan crude oil) boiling within the range of from about 170° to about 225°C. and having the following composition, according to the general classes of the hydrocarbons present:

|  | Wt.% |
| --- | --- |
| $C_{10}$—$C_{15}$ aliphatic paraffins | 73 |
| $C_9$—$C_{15}$ naphthenes | 24 |
| $C_8$—$C_{15}$ aromatics | 3 | is resolved into the following two classes of components: (1) straight-chain or normal paraffins and (2) a mixture of isoparaffinic and cyclic hydrocarbons. The recovered normal paraffins are thereafter dehydrogenated to their mono-olefin analogs and these are thereafter used to alkylate benzene to form phenyl-substituted normal alkanes. The n-paraffin-benzene alkylate mixture is sulfonated, followed by neutralization of the hydrocarbon portion to yield the alkylaryl sulfonate salt, a water-soluble, biodegradable or "soft" detergent.

In the first step of the reaction sequence, the normal paraffins in the straight-run fraction are separated therefrom by contacting the mixture with pelleted alumino-silicate molecular sieves which selectively sorb the normal paraffinic components of the mixture and leave a nonsorbed raffinate consisting of isoparaffins and the cyclic hydrocarbons present in the fraction. For effecting this separation, the straight-run kerosene fraction is poured at room temperature (25°C.) into a vertical column packed with the molecular sieve pellets; the resulting column is 5 ft. in length and contains 3.8 ft. of the pellets, each having a dimension of approximately ⅛ inch × ⅛ inch. A raffinate effluent from the bottom of the column of molecular sieves consists of n-paraffin-free hydrocarbons. The normal paraffin components of the kerosene fraction (about 37% of the total volume of kerosene) remain within the column, sorbed on the molecular sieve particles. The residual raffinate retained on the surface of the pellets is washed from the column by pumping isopentane into the top of the column and draining the effluent from the bottom. Any isopentane remaining on the pellet surfaces is separated from the recovered n-paraffin sorbate product by distillation. Raffinate contained in the wash effluent is recovered as bottoms on distillation of the wash effluent.

After completely draining the column of isopentane wash, the n-paraffins sorbed from the kerosene feed stock are desorbed by filling the column with liquid n-pentane at 25°C., allowing the n-pentane to displace by the mass action effect the kerosene-derived n-paraffins present in the pores of the molecular sieve particles, and after 10 minutes, the liquid surrounding the sorbent particles is drained into a distillation flask. The column is again filled with n-pentane and after standing for an additional 10 minutes, the liquid in the column is drained into a second distillation flask. Distillation of the n-pentane from the effluent stream in each case left a residue of kerosene n-paraffins (98.5 percent normal components of $C_{11}$—$C_{15}$ chain length) in each flask, 96 percent of the total recovered sorbate being in the first flask. The resultant n-paraffins are then further fractionated to obtain a $C_{12}$ (dodecane) fraction containing 99.5% dodecane and 0.6% isomers.

The recovered $C_{12}$ n-paraffin is thereafter dehydrogenated by passing the paraffin in admixture with hydrogen at an 8:1 hydrogen to paraffin mole ratio to a small pilot plant reactor maintained at isothermal conditions of 470°C. and 10 psig. The feedstock charge rate (in terms of liquid hourly space velocity) is 32 volumes of paraffin charge per volume of catalyst per hour. The catalyst packed in the pilot plant reactor is an arsenic-containing lithiated platinum catalyst containing 0.75 wt.% platinum on alumina, 0.47 arsenic to platinum mole ratio and 0.5 wt.% lithium. The product effluent is cooled and normal gaseous components removed to provide a liquid product containing 11.1 wt.% dodecene, 87.8 wt.% dodecane, and small amounts of diolefins and aromatics.

This liquid product containing the $C_{12}$ mono-olefin is mixed with 10 molar proportions of benzene to $C_{12}$ mono-olefin and the hydrocarbon mixture cooled to 0°C. as hydrofluoric acid of 97.5% concentration is added with stirring, to provide a weight ratio of acid to olefins of 1.5. This mixture is maintained and agitated for 1.5 hours, maintaining a temperature of about 0°C. The mixture is then allowed to settle and the upper hydrocarbon phase is withdrawn and washed with dilute caustic and then distilled to remove excess benzene. The remainder consists essentially of 16.8 wt.% dodecyl benzene, 83.1 wt.% $C_{12}$ n-paraffin and trace amounts of unreacted olefin. A portion of this material is further distilled to remove these paraffins, etc. to produce an essentially pure dodecylbenzene.

The remaining liquid product containing the dodecane and dodecylbenzene mixture is placed in an agitated flask maintained at 15°C. by a constant temperature bath as fuming sulfuric acid containing 20% sulfur trioxide is gradually added over a period of two hours with stirring to provide a final weight ratio of acid to dodecylbenzene of 1.25. This mixture is maintained at 15°C. with agitation for an additional 1.5 hours to insure essentially complete sulfonation of the alkylaromatic. The mixture is then allowed to settle and two separate layers form, a black acid lower phase and a very light yellow-colored top hydrocarbon phase. The top hydrocarbon phase is passed into an equal volume of water, also maintained at 15°C. with the resultant mixture being completely colorless. The mixture is maintained at 15°C. and neutralized to a phenolphthalein end point with a 10 wt.% aqueous solution of sodium hydroxide. The mixture is allowed to settle to form an upper hydrocarbon phase and a lower aqueous phase containing the neutralized dodecylbenzene sulfonate. This lower phase is separated and dried to yield an essentially all white detergent product essentially free from inorganic salts. A portion of the hydrocarbon phase is also evaporated, leaving little residue, indicating no appreciable amounts of alkylaromatic sulfonate to be present. The lower acid phase is also neutralized and evaporated to dryness to form a dark, discolored solid. This solid is extracted with ethanol, with the ethanol upon evaporation leaving essentially no residue, thus indicating all of the alkylaromatic sulfonate to be in the original hydrocarbon phase present upon the completion of the sulfonation reaction.

The dodecylbenzene obtained by the removal of the admixed dodecane was sulfonated in the same manner as the dodecane-dodecylbenzene mixture except that upon completion of the reaction, a single dark-brown solution resulted which upon neutralization and drying yielded a yellow dodecylbenzene sulfonate-sodium sulfate mixture.

EXAMPLE II

A run somewhat similar to Example I is performed utilizing the entire $C_{11}$—$C_{15}$ n-paraffin mixture. This mixture of homologs is dehydrogenated, the resultant olefins alkylated, the resultant alkylated benzene sulfonated and the sulfonated alkylaromatic neutralized in the same manner as the dodecane-dodecylbenzene mixture of Example I. The resultant neutralized sulfonate recovered from the hydrocarbon phase of the sulfonation reaction is a white, inorganic salt-free detergent of equivalent quality as that formed in Example I. The unconverted paraffins are dried and blended with the $C_{11}$—$C_{15}$ paraffin passed to the dehydrogenation reaction.

CONCLUSIONS

From the foregoing specification and examples, the beneficial import of the process of this invention is readily apparent to those trained in the art. This process offers a means of converting $C_9$—$C_{18}$ n-paraffins and a monocyclic aromatic into an alkylaromatic sulfonate containing a $C_9$—$C_{18}$ linear alkyl group without involving the intermediate separation of the n-paraffin. Further, this process makes possible the production of alkylaromatic sulfonates free from inorganic salts, thus alleviating the necessity of extracting such salts from the final product heretofore practiced in the art. Most importantly, this process offers a means for producing alkyl-aromatic sulfonates free from undesirable colorbodies without involving sophisticated bleaching and separation techniques.

We claim as our invention:

1. A process for producing an alkylaromatic sulfonate containing a $C_9$—$C_{18}$ linear alkyl group which comprises the steps of:

a. monohalogenating a $C_9$—$C_{18}$ n-paraffin by contacting bromine or chlorine with an excess of said n-paraffin to form a $C_9$—$C_{18}$ linear monohalogenated n-paraffin, recovering from the resultant monohalogenation effluent said $C_9$—$C_{18}$ linear monohalogenated paraffin in admixture with unreacted $C_9$—$C_{18}$ n-paraffin, said unreacted $C_9$—$C_{18}$ n-paraffin being present in an amount of from about 20 to about 96 wt.% of $C_9$—$C_{18}$ monohalogenated paraffin;

b. alkylating a monocyclic aromatic selected from the group consisting of benzene, lower alkyl substituted benzene, phenol and mono-nitrobenzene with said $C_9$—$C_{18}$ linear monohalogenated n-paraffin in admixture with the unreacted $C_9$—$C_{18}$ n-paraffin to form an alkylaromatic containing a $C_9$—$C_{18}$ linear alkyl group;

c. separating unreacted monocyclic aromatic from the resultant effluent of step (b) which contains said unreacted monocyclic aromatic, $C_9$—$C_{18}$ linear alkylaromatic, and $C_9$—$C_{18}$ n-paraffin;

d. sulfonating the alkylaromatic of step (c) in admixture with the $C_9$—$C_{18}$ n-paraffin of step (c), with an acidic sulfonating agent to form an alkylaromatic sulfonic acid, said acidic sulfonating agent being selected from the group consisting of sulfuric acid and oleum and being present in an amount in excess of the stoichiometric quantity required to sulfonate said alkylaromatic;

e. separating the resultant sulfonation mixture into an acid phase containing excess acidic sulfonating agent and a hydrocarbon phase containing said $C_9$—$C_{18}$ n-paraffin and said alkylaromatic sulfonic acid;

f. neutralizing the hydrocarbon phase by admixing that phase with an aqueous solution of a base selected from the group consisting of ammonia and the hydroxides and carbonates of sodium, potassium, lithium and magnesium to form a swater-soluble neutralized alkylaromatic sulfonate;

g. forming a hydrocarbon phase containing unreacted $C_9$—$C_{18}$ n-paraffin, and an aqueous phase containing water-soluble neutralized aromatic sulfonate;

h. separating the phases formed in step (g);

i. recovering water-soluble alkylaromatic sulfonate from the aqueous phase; and, j. recycling at least a portion of the separated unreacted $C_9$—$C_{18}$ n-paraffin of step (g) to monohalogenation step (a).

2. The process of claim 1 further characterized in that said monocyclic aromatic is benzene, said sulfonating agent is oleum and the hydrocarbon phase is neutralized with an aqueous solution of sodium hydroxide.

* * * * *